United States Patent
Zhang et al.

(10) Patent No.: US 9,766,944 B2
(45) Date of Patent: Sep. 19, 2017

(54) DYNAMIC PARTITION DUAL BOOT MOBILE PHONE DEVICE

(71) Applicant: Microsoft Technology Licensing, LLC, Redmond, WA (US)

(72) Inventors: Dejun Zhang, Redmond, WA (US); Bin Wang, Bellevue, WA (US); Ying N. Chin, Bellevue, WA (US); Pengxiang Zhao, Bellevue, WA (US); Robert Y. Zhu, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 207 days.

(21) Appl. No.: 14/688,401

(22) Filed: Apr. 16, 2015

(65) Prior Publication Data

US 2015/0277986 A1    Oct. 1, 2015

Related U.S. Application Data

(63) Continuation-in-part of application No. 14/225,096, filed on Mar. 25, 2014.

(51) Int. Cl.
*G06F 9/00* (2006.01)
*G06F 15/177* (2006.01)
(Continued)

(52) U.S. Cl.
CPC ............ *G06F 9/5077* (2013.01); *G06F 9/441* (2013.01)

(58) Field of Classification Search
None
See application file for complete search history.

(56) References Cited

U.S. PATENT DOCUMENTS 6,401,183 B1    6/2002    Rafizadeh
6,807,665 B2   10/2004   Evans et al.
(Continued)

FOREIGN PATENT DOCUMENTS

CN    102045449 A    5/2011
WO    2013142465 A1   9/2013

OTHER PUBLICATIONS

Hruska, Joel, "Microsoft and Google Kill off Intel-Asus Dual OS Tablet Effort", Published on: Mar. 14, 2014 Available at: http://www.extremetech.com/computing/178552-microsoft-google-kill-off-intel-and-asus-dual-os-tablet-effort.
(Continued)

*Primary Examiner* — Nitin Patel
(74) *Attorney, Agent, or Firm* — Alleman Hall Creasman & Tuttle LLP

(57) ABSTRACT

Embodiments are disclosed that relate to multi boot mobile phone devices. In one example, a mobile phone device comprises one or more non-volatile storage devices including an empty partition, a blob partition storing two or more operating systems in a compressed format, a boot selection module configured to recognize user selection of at least one of the two or more operating systems, and a boot allocation module configured to, responsive to user selection of at least one of the two or more operating systems, split the empty partition into a different operating system partition for each selected operating system, decompress each selected operating system, and store each decompressed operating system on its respective operating system partition.

20 Claims, 8 Drawing Sheets

(51) Int. Cl.
 G06F 9/50 (2006.01)
 G06F 9/44 (2006.01)

(56) References Cited

U.S. PATENT DOCUMENTS

| | | | |
|---|---|---|---|
| 6,928,542 | B2 | 8/2005 | Wen et al. |
| 7,136,994 | B2 | 11/2006 | Zimmer et al. |
| 7,533,350 | B2 | 5/2009 | Vineyard et al. |
| 7,779,243 | B2 | 8/2010 | Adrangi et al. |
| 7,818,736 | B2 | 10/2010 | Appavoo et al. |
| 8,090,938 | B2 | 1/2012 | Xu |
| 8,762,699 | B1 | 6/2014 | Streuter et al. |
| 8,799,631 | B2 | 8/2014 | Batwara et al. |
| 8,868,899 | B2 | 10/2014 | Galicia et al. |
| 8,898,443 | B2 | 11/2014 | Reeves et al. |
| 2007/0162901 | A1 | 7/2007 | Oh |
| 2009/0089569 | A1 | 4/2009 | Baribault et al. |
| 2011/0098583 | A1 | 4/2011 | Pandia et al. |
| 2011/0126216 | A1 | 5/2011 | Galicia et al. |
| 2012/0102314 | A1 | 4/2012 | Zheng et al. |
| 2014/0149647 | A1* | 5/2014 | Guo .................. G06F 3/06 711/103 |

OTHER PUBLICATIONS

Cawley, Christian, "HTC HD2 Guide to Dual Boot Android and Windows Phone 7", Published on: Dec. 4, 2012 Available at: http://www.brighthub.com/mobile/windows-mobile-platform/articles/123415.aspx.

Sun, et al., "Supporting Multiple OSes with OS Switching", in Proceedings of USENIX Annual Technical Conference, Jun. 17, 2007, pp. 357-362.

Martin, Taylor, "The Beauty of Choice: Windows Phone on Android Hardware", Published on: Mar. 6, 2014 Available at: http://pocketnow.com/2014/03/06/windows-phone-on-android-hardware.

Sims, Gary, "Phones that can Run Two Operating Systems Simultaneously Coming by the End of 2013", Published on: Nov. 27, 2012 Available at: http://www.androidauthority.com/phones-that-can-run-two-operating-systems-simultaneously-134586/.

Asad, T., "Dual Boot Windows Mobile and Android," Available Online at http://www.redmondpie.com/how-to-dual-boot-windows-mobile-and-android-on-windows-phone-9140407/, Jan. 30, 2010, 4 pages.

Deniss, "WinPad A-97 Tablet PC, Tablet Dual-Boot Windows 7 and Android 22," Available Online at http://chinitech.com/en/tablet-pc/tablette-winpad-a-97-tablette-dual-boot-windows-7-et-android-2-2/, Apr. 1, 2011, 3 pages.

Warren, T., "Ativ Q: A First Look at Samsung's New Windows 8 and Android Hybrid Laptop," Available Online at http://www.theverge.com/2013/6/20/4449116/samsung-ativ-q-windows-8-android-hybrid-hands-on-photos-video, Jun. 20, 2013, 3 pages.

Gorman, M., "Canonical Gives Developers a Preview of a Dual-Booting Ubuntu and Android Future," Available Online at http://www.engadget.com/2013/12/23/canonical-dual-boot-android-ubuntu-developer-preview/, Dec. 23, 2013, 4 pages.

Savov, V., "The Transformer Book Duet Combines Windows with Android, Tablet with Laptop," Available Online at http://www.theverge.com/2014/1/6/5280850/asus-transformer-book-duet-hands-on-ces-2014, Jan. 6, 2014, 3 pages.

Paul, Jeffrey M. et al., "User Selectable Operating Systems," U.S. Appl. No. 14/225,096, filed Mar. 25, 2014, 41 pages.

Aloni, T., "[Tool] SparseConverter v1.0.0," Available Online at http://forum.xda-developers.com/showthread.php?t=2749797, May 13, 2014, 6 pages.

"Use the Flashing Tools Provided by Microsoft," Available Online at https://dev.windowsphone.com/en-US/OEM/docs/Phone_Bring-Up/Use_the_flashing_tools_provided_by_Microsoft, Dec. 15, 2014, 5 pages.

Fingas, J., "TomTom's New GPS Watches Track Your Heart Rate Without a Chest Strap," Engadget Website, Available Online at http://www.engadget.com/2014/04/03/tomtom-cardio-gps-watches/, Apr. 3, 2014, 8 pages.

Goode, L., "Samsung's New Gear Fit Needs to Work on the 'Fit' Part," re/code Website, Available Online at http://recode.net/2014/04/08/samsungs-new-gear-fit-needs-to-work-on-the-fit-part/, Apr. 8, 2014, 9 pages.

NDTV Correspondant, "Samsung Gear Fit, Gear 2 and Gear 2 Neo Go on Sale Worldwide," NDTV Gadgets360 Website, Available Online at http://gadgets.ndtv.com/wearablesinews/samsung-gear-fit-gear-2-and-gear-2-neo-go-on-sale-worldwide-507220, Apr. 11, 2014, 3 pages.

Poeter, D., "Meet Simband, Samsung's Next-Gen Health Tracker," PC Mag Website, Available Online at http://www.pcmag.com/article2/0,2817,2458663,00.asp, May 28, 2014, 18 pages.

* cited by examiner

DYNAMIC PARTITION DUAL BOOT MOBILE PHONE DEVICE

CROSS REFERENCE TO RELATED APPLICATIONS

This application is a continuation-in-part of U.S. Ser. No. 14/225,096, filed Mar. 25, 2014, the entirety of which is hereby incorporated herein by reference.

BACKGROUND

Computing devices typically use a single operating system to manage system resources and run various applications. While a device may technically be capable of using two or more different operating systems, devices typically only ever use the single operating system that is initially installed on the device.

SUMMARY

Embodiments are disclosed that relate to multi boot mobile phone devices. In one example, a mobile phone device comprises one or more non-volatile storage devices including an empty partition, a blob partition storing two or more operating systems in a compressed format, a boot selection module configured to recognize user selection of at least one of the two or more operating systems, and a boot allocation module configured to, responsive to user selection of at least one of the two or more operating systems, split the empty partition into a different operating system partition for each selected operating system, decompress each selected operating system, and store each decompressed operating system on its respective operating system partition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
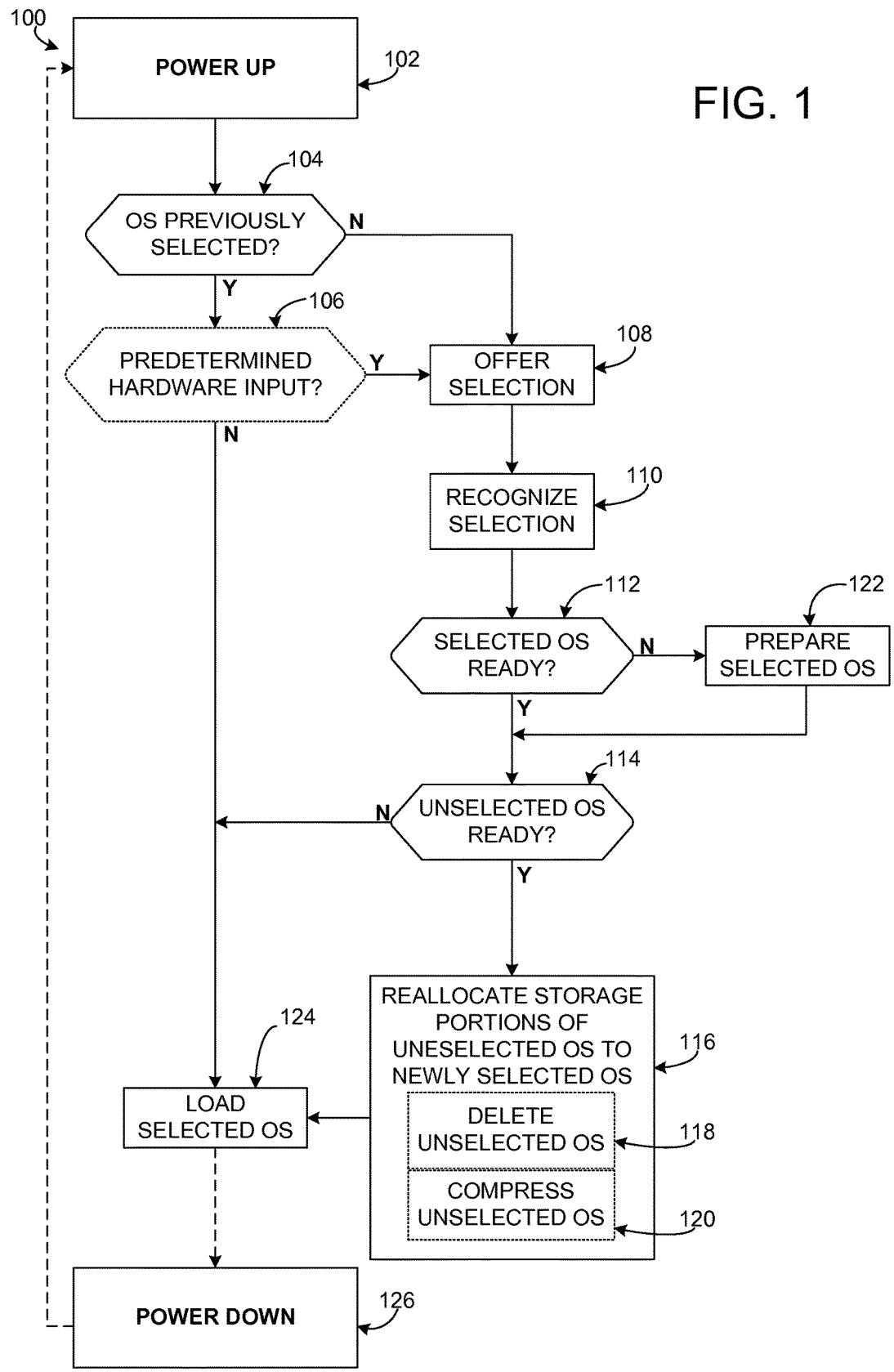
FIG. 1 shows a method for a dual boot phone device.

FIG. 1 shows a method 100 for a dual boot mobile phone device. The dual boot mobile phone device may be manufactured with two or more operating systems (e.g., Windows Phone™, Android™, iOS™) installed. During an initial power up, the dual boot mobile phone device allows one of the operating systems (OS) to be selected. Upon selection, memory storage that was previously used by unselected operating system(s) may be reallocated to the selected operating system. In this way, the dual boot mobile phone device can be customized with a desired operating system while utilizing memory storage that would otherwise be occupied by an unselected operating system.

On subsequent power ups, after an operating system has been selected, the dual boot mobile phone device may be configured to load the selected operating system by default. In this way, the dual boot mobile phone device can provide a "one-time" dual boot experience in which the user is provided one opportunity to select the operating system that will always be used. However, the mobile phone device optionally may be configured to allow a previously unselected operating system to replace the previously selected operating system as the selected operating system. In this way, the dual boot mobile phone device may provide a "multi-time" dual boot experience in which the user may repeatedly change the default operating system.

At 102 of method 100, the dual boot mobile phone device is powered up. As part of the power up procedure, the dual boot mobile phone device may load an operating system, which will manage the hardware, firmware, and software resources of the dual boot mobile phone device during operation.

In some implementations, a primary boot loader (PBL) may be activated to load the operating system. The PBL may be implemented as firmware of the mobile phone device. The PBL is responsible for controlling the mobile phone device during an initial phase of the power up procedure. In some implementations, the size of the PBL may be limited by hardware and/or other constraints of the dual boot mobile phone device. As a result, the primary boot loader may not include all necessary logic for loading the operating system. In such implementations, one function of the PBL is to activate a secondary boot loader (SBL), which is responsible for controlling the mobile phone device during a subsequent phase of the power up procedure.

As introduced above, the dual boot mobile phone device may not be configured with a pre-selected default operating system. Instead, a default operating system is selected, by the user, during an out-of-box power up experience. In some implementations, the SBL may activate a unified extensible firmware interface (UEFI), which is responsible for displaying a user interface for operating system selection and 'flagging' the chosen operating system. The secondary boot loader and unified extensible firmware interface may be implemented as software stored in memory storage of the mobile phone device.

While a primary boot loader, a secondary boot loader, and a unified extensible firmware interface are provided as examples, other hardware, firmware, and/or software module(s) may be responsible for handling the operating system selection and loading functions described herein.

As part of the power up functions implemented by the PBL, SBL, UEFI, or other modules, the mobile phone device may respond to one or more operating system selection triggers that indicate that an operating system selection is to be made.

As one example, at 104, method 100 includes determining if an operating system had been previously selected. The mobile phone device may be initially configured without a pre-selected default operating system. As such, during the mobile phone device's first out-of-box power up, it will be determined that an operating system has not been previously selected. As discussed below, an operating system may be selected by a user as part of the out-of-box experience. After this initial selection by the user, during subsequent power ups, it will be determined that an operating system has been previously selected. The lack of a previously-made operating system selection is an example of an operating system selection trigger that indicates that an operating system selection is to be made.

An operating system selection flag may be checked to determine if an operating system has been selected as the default operating system. The operating system selection flag's state may be checked by the SBL, for example. The flag's state may be saved in any suitable manner that indicates if an operating system has been selected. In general, the flag state will be set to indicate that an operating system has not yet been selected when the mobile phone device powers up for the first time. After an operating system is selected for the first time, the flag state will be changed to indicate that an operating system has been selected, and optionally, which operating system has been selected.

In some implementations, an operating system selection flag may take the form of a uint32 flag. Such a flag may be set/accessed by the UEFI. The flag may also be set directly by an original equipment manufacturer by writing data to a status partition.

If, at 104, an operating system had been previously selected, method 100 proceeds to 106. If, at 104, no operating system had been previously selected, method 100 proceeds to 108.

At 106, method 100 optionally includes determining if a predetermined hardware input is provided during power up. A predetermined hardware input may be any input recognizable by the mobile phone device during power up, such as a brief hardware button press, a sustained hardware button press, a combination of different hardware buttons presses, etc. As one example, a power on button and a menu selection button may be simultaneously pressed for three seconds. A predetermined hardware input is another example of an operating system selection trigger that indicates that an operating system selection is to be made.

If a predetermined hardware input is provided at 106, the power up is interrupted and method 100 proceeds to 108. If a predetermined hardware input is not provided at 106, method 100 proceeds to 122 without interruption. While the lack of a previously selected operating system and a predetermined hardware input are provided as examples of operating system selection triggers, other triggers may be implemented. For example, an application may be configured to allow a user to select a new operating system. As another example, every cold boot may serve as an operating selection trigger.

Figure 2:
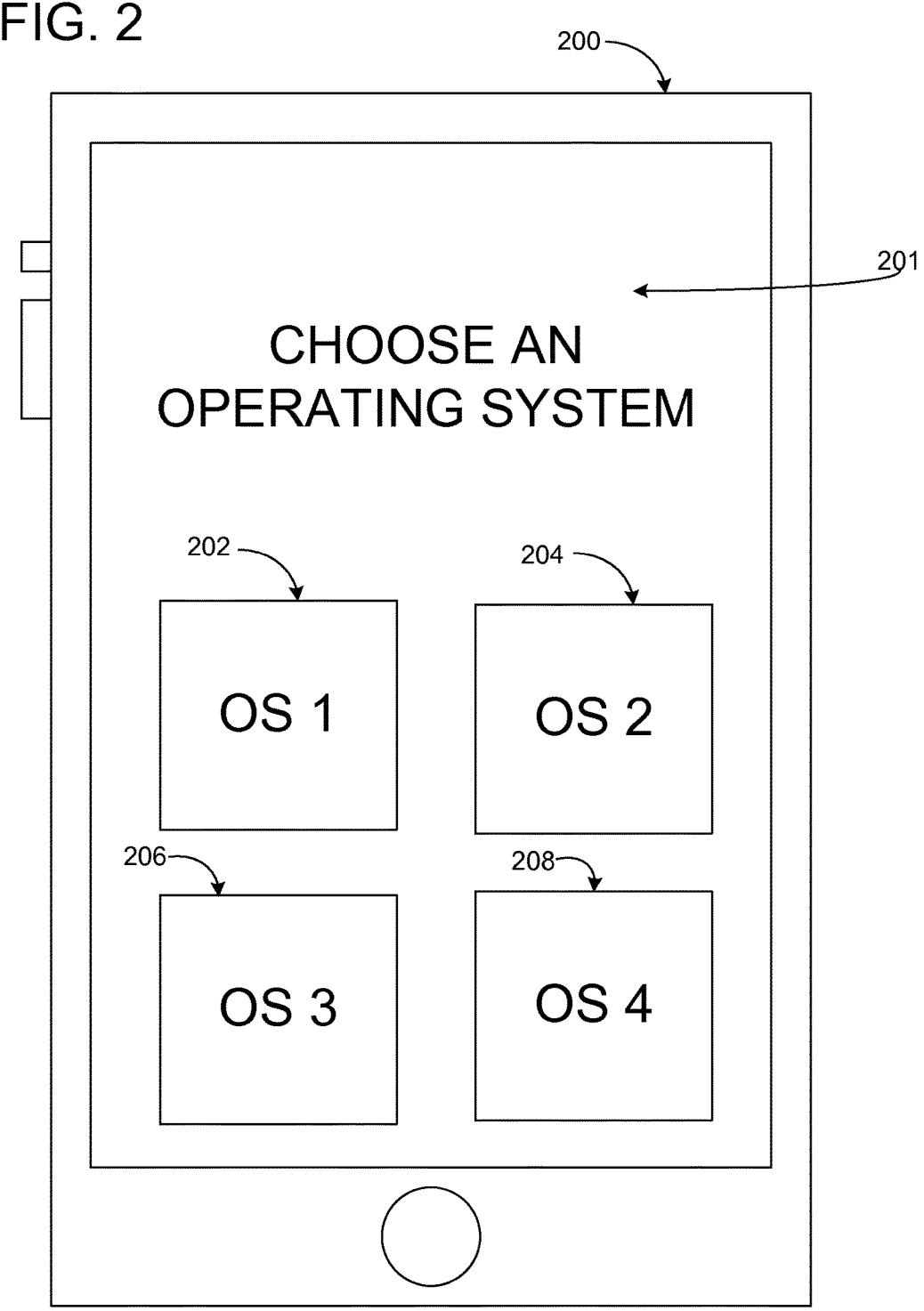
FIG. 2 shows a user interface for selection of an operating system.

At 108 of FIG. 1, method 100 includes presenting a user interface for selecting one of a plurality of operating systems. As a non-limiting example, FIG. 2 shows a dual boot mobile phone device 200 displaying a user interface 201 for selecting between four different operating systems. User interface 201 includes a button 202 for selecting OS 1, a button 204 for selecting OS 2, a button 206 for selecting OS 3, and a button 208 for selecting OS 4. In general, a user interface may provide an option for selecting each available operating system. While touch-selectable buttons are provided as non-limiting examples, a user interface may present OS-selection options in any suitable manner. For example, physical volume up and volume down buttons may be used to cycle through possible operating systems, and a physical power button may be used to select an operating system. Additionally, while four operating systems are shown in FIG. 2, this is in no way limiting. Two, three, or more than four operating systems may be pre-loaded on the dual boot mobile phone device. As discussed below, one or more complete operating systems, partial operating systems, and/ or re-install seeds may be pre-loaded in compressed or uncompressed form.

The order of the operating systems on a user selection interface optionally may be randomized to limit selection bias based on position. If a default operating system has already been chosen, the user interface may indicate which of the available operating systems is the currently-selected operating system.

At 110 of FIG. 1, method 100 includes recognizing selection of a selected operating system from the plurality of operating systems. For example, with reference to FIG. 2, a user may press button 208 and thereby select OS 3. The mobile phone device 200 may recognize the user-selection of OS 3. Responsive to recognizing the user-selection, the UEFI or another component may set the state of the operating system selection flag. As discussed above, the SBL or another component may subsequently recognize the user's selection by checking the state of the operating system selection flag. Prior to setting the operating system selection flag, or otherwise acknowledging selection of a default operating system, a confirmation user interface optionally may appear on the graphical display of the device. The confirmation user interface may allow a user to confirm selection of the default operating system, or go back to the previous user interface to re-select a default operating system.

In some implementations, the user interface(s) for selection and/or confirmation of an operating system may "time out" if a selection is not made or confirmed within a predetermined amount of time. For example, if a user does not respond within 30 seconds, the mobile phone device may time out. In the event of such a time out, a previously-selected operating system may be loaded or the device may power down.

At 112, method 100 includes determining if the selected operating system is ready for booting on the mobile phone device. If the selected operating system is ready, then method 100 proceeds to 114. If at 112 the selected operating system is not ready, then method 100 proceeds to 122 where the selected operating system is readied. As examples, if a selected operating system is not installed, the selected operating system may be installed via a seed or other mechanism. As another example, if the selected operating system is compressed, the selected operating system may be expanded (e.g., decompressed).

At 114, method 100 includes determining if an unselected operating system is ready. If at 114 an unselected operating system is ready, method 100 proceeds to 116. If an unselected operating system is not ready, then method 100 proceeds to 124.

At 116, method 100 includes reallocating one or more storage portions occupied by the plurality of operating systems other than the selected operating system to the selected operating system. In other words, memory storage occupied by one or more unselected operating systems may be repurposed to increase the memory storage available to the selected operating system. For example, space previously allocated to an unselected operating system may be recovered as end user storage for the selected operating system. As examples, a Windows Phone™ OS or Android™ OS partition map may be updated as part of the reallocation process.

Permanent and/or removable memory storage may be reallocated. However, in some implementations, removable memory storage (e.g., a removable storage card) may be protected from reallocation.

To ensure that all partition names are globally unique and thereby avoid collisions between different operating systems, some storage portions of one or more operating systems may be named/renamed as part of the manufacturing/set up procedure. For example, files may be renamed with a prefix, suffix, or other modifier particular to a specific operating system to ensure different operating systems do not have identically named files.

In some implementations, as part of a reallocation of memory storage and/or an independent process, storage parameters may be configured for the selected operating system. As examples, if Windows Phone™ OS is selected, the user data storage portion may be configured NTFS; similarly, if Android™ OS is selected, the user data storage portion may be configured EXT4—e.g., the file system of each user data storage portion may be formatted in accordance with a selected operating system.

Components such as a sensor fusion processor or WiFi controller may utilize different device firmware flashed for different operating systems. Such device firmware may be flashed as part of a reallocation process, as part of a cold boot process, and/or as part of an independent process.

In some implementations, complete versions of two or more operating systems may be maintained. In such implementations, a user may select between different operating systems at every power up or every cold boot.

At 118, reallocating storage portions optionally may include deleting one or more portions of an unselected operating system. One or more portions may be deleted during the initial reallocation processes, and/or portions of the unselected operating system(s) subsequently may be deleted as the selected operating system expands and requests additional memory storage. Prior to deletion, a snapshot of the pre-deletion configuration optionally may be saved, and such snapshot later may be used to return the mobile phone device to the pre-deletion configuration. A snapshot may be saved in network accessible storage (e.g., cloud storage), local storage, and/or removable storage, as examples.

At 120, reallocating storage portions optionally may include compressing one or more portions of an unselected operating system. One or more portions may be compressed during the initial reallocation processes, and/or portions of the unselected operating system(s) subsequently may be compressed as the selected operating system expands and requests additional memory storage. This may be implemented as an alternative to or in combination with the deletion of operating systems.

At 122, method 100 includes preparing a selected operating system. A preparation may include an installation of the selected operating system with corresponding components via a re-install seed or decompressing the selected operating system wherein the selected operating system is in a compressed format on the mobile phone device.

In some implementations, alternate reallocation tools may be configured to change selection of a default operating system. Such alternate reallocation tools may be separate from the dual boot mobile phone device. For example, the reallocation tools may include hardware that flashes a mobile phone device with new data provided via one or more different types of media. Such hardware may be made available in a retail store, a distribution center, and/or to end users directly. A PC tool, an SD card, and/or an over-the-air medium (e.g., cloud computing medium) may hold the data used by the reallocation tool to change selection of the default operating system, for example.

At 124, method 100 includes loading the selected operating system. The selected operating system may be loaded by the power up module. In some implementations, an SBL of the power up module may load the selected operating system.

As indicated in FIG. 1, after the dual boot mobile phone device is powered down at 126, method 100 returns to 102, where the dual boot mobile phone device subsequently may be powered back up. As discussed above, during an initial out-of-box experience, the dual boot mobile phone device will not have a default operating system, and method 100 will branch to 108 so that a default operating system can be selected. In one-time dual boot implementations, on subsequent power ups, method 100 may proceed directly to 122 where the default operating system selected during the out-of-box power up is loaded. In these implementations, the unselected operating systems may be fully deleted, including secrets, keys, and other information otherwise preserved for re-selection of an operating system. As discussed above, in multi-time dual boot implementations, the power up process may be selectively interrupted at 106 so that the user is able to change the default operating system. In still other implementations, a mobile phone device may be configured to interrupt during every cold boot, regardless of user input.

In a one-time dual boot mobile phone device implementation, an operating system is selected only once, allowing additional memory storage to be reallocated to the selected operating system by deleting unselected operating system(s) and associated data. A one-time dual boot mobile phone device may provide a fast user-selection experience that has a relatively high space efficiency. Prior to user selection of an operating system, different partitions may be configured for different operating systems, and each operating system can use a different user data partition. As part of the reallocation procedure, two or more partitions may be merged together, thus reducing/eliminating wasted space after the selection. A one-time dual boot mobile phone device can support original equipment manufacturer customization.

Figure 3:
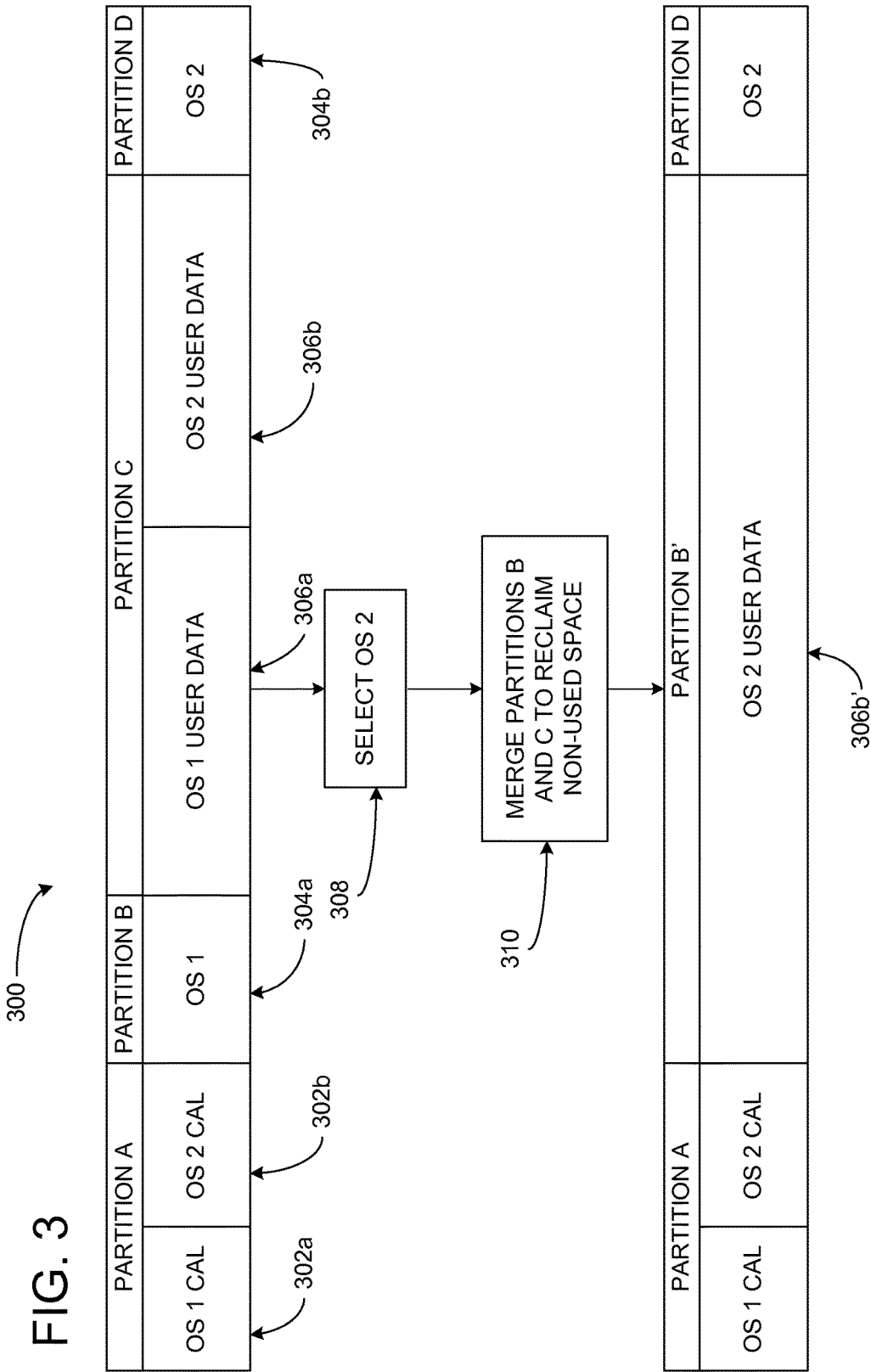
FIG. 3 shows a repartitioning of memory storage of a one-time dual boot device following selection of an operating system.

As an example, FIG. 3 schematically shows a reallocation of memory storage 300 for a one-time dual boot mobile phone device. Memory storage 300 may be implemented as one or more nonvolatile memory devices. In order to ease understanding, memory storage 300 is illustrated in simplified form. It is to be understood that memory storage may include additional partitions and/or store additional data.

Before reallocation, memory storage 300 includes Partition A, Partition B, Partition C, and Partition D.

Partition A may include calibration data storage portion 302*a* for OS 1 and calibration data storage portion 302*b* for OS 2. Each calibration data storage portion may include components to run its corresponding operating system.

Partition B may include operating system storage portion 304*a* for OS 1, whereas Partition D may include operating system storage portion 304*b* for OS 2.

Partition C may include user data storage portion 306*a* for OS 1 and user data storage portion 306*b* for OS 2. The user data storage portions may include non-system applications and user-specific data such as contacts, email, text messages, photos, music, personal preferences, and the like.

Responsive to selection 308 of OS 2, at 310, Partition B and Partition C are merged into Partition B'.

Partition B' includes user data storage portion 306b' of selected OS 2. Responsive to the selection of OS 2, the memory storage of operating system storage portion 304a and user data storage portion 306a are reallocated to user data storage portion 306b'. Partition D and Partition A, including the operating system storage portion 304b, calibration data storage portion 302a, and calibration data storage portion 302b, are maintained through the reallocation and repartitioning.

Generally, a dual boot selection module (FIG. 8) may be configured to recognize user selection of a second operating system (e.g., OS 2)—e.g., selection of the second operating system and not a first operating system. A dual boot allocation module (FIG. 8) may be configured to, responsive to user selection of the second operating system, automatically merge first and second partitions (e.g., Partitions B and C) into a merged partition (e.g., Partition B'), and automatically store user data (e.g., user data storage portion 306b) of the second operating system on the merged partition (Partition B'). In some implementations, the dual boot allocation module may be further configured to delete the first operating system and first user data of the first operating system (e.g., responsive to user selection of the second operating system). In some implementations, the dual boot allocation module may be further configured to automatically maintain third and fourth partitions (e.g., Partitions A and D) in addition to the merged partition (e.g., Partition B') (e.g., responsive to user selection of the second operating system).

In some implementations, a mobile phone device may be configured with an on-the-fly dynamic partition layout that supports two or more side-by-side operating systems, thereby allowing a user to switch back and forth between selected operating systems. For example, a user may load any of the side-by-side operating systems when the mobile phone device is powered up. The side-by-side operating systems may be selected from a set of operating systems. For example, a mobile phone may be manufactured with a set of six full-version and/or trial version operating systems, and a user may choose three of the six operating systems for side-by-side existence on the mobile phone device. When the user powers up the mobile phone device, the user may select any of the three side-by-side operating systems, and the mobile phone device may load that operating system.

Furthermore, the unselected operating system(s) that are not selected for side-by-side existence on the mobile phone device optionally may be maintained on the on-the-fly mobile phone device to allow for multiple re-selections of operating system(s). A flexible partition layout may be implemented on an on-the-fly mobile phone device to accommodate dynamic partitioning for one, two, three, or even more operating systems. To accommodate the flexible partition layout, an on-the-fly mobile phone device may include a dynamic partition configuration file that may adjust according to which and how many operating systems are selected. An original equipment manufacturer may be able to customize the partition layout on an on-the-fly mobile phone device due to the flexibility of the partition layout. The memory storage of an on-the-fly mobile phone device is efficient because unselected operating systems are not maintained in a full, uncompressed state. At the same time, the load time of any of the selected side-by-side operating systems is kept low, because each of the selected side-by-side operating systems are decompressed and ready to be loaded.

Figure 4:
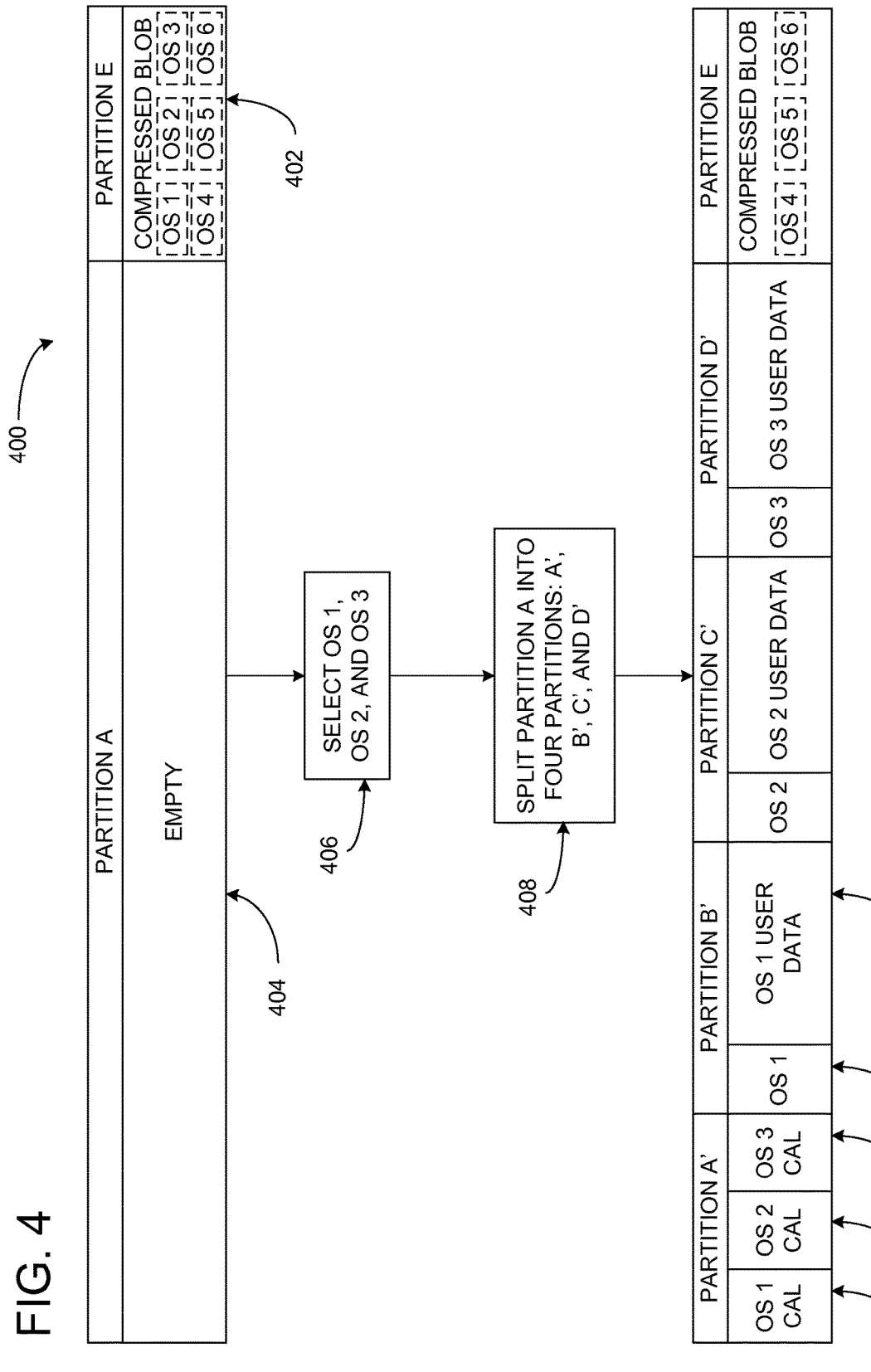
FIG. 4 shows a repartitioning of memory storage of an on-the-fly mobile phone device following selection of three operating systems.

As an example, FIG. 4 schematically shows memory storage 400 for an on-the-fly mobile phone device. Memory storage 400 may be implemented as one or more nonvolatile memory devices. Prior to selection, memory storage 400 includes Partition A and Partition E. In order to ease understanding, memory storage 400 is illustrated in simplified form. It is to be understood that memory storage 400 may include additional partitions and/or store additional data.

Partition E may include a compressed blob storage portion 402. The compressed blob storage portion may include available operating system(s) and associated components (e.g., a user data storage portion, a calibration data storage portion, an operating system storage portion, and so forth) in a compressed format that may be decompressed responsive to a selection of operating system(s). For example, compressed blob storage portion 402 may include OS 1, OS 2, OS 3, OS 4, OS 5, and OS 6 in a compressed format.

Because the available operating systems and associated components are compressed, a significant portion of the memory storage is unused prior to an out-of-box power up of the mobile phone device. For example, Partition A may include empty storage portion 404.

At 406, OS 1, OS 2, and OS 3 are selected. As a non-limiting example, the selected operating systems may be selected in accordance with steps 108 and 110 of FIG. 1 and/or user interface 202 of FIG. 2.

At 408, responsive to a selection of OS 1, OS 2, and OS 3, Partition A is split into Partition A', Partition B', Partition C', and Partition D'. Partition E is maintained through the repartitioning. Optionally, the size of Partition E may be decreased.

Additionally, the empty storage portion 404 is allocated to each of the three operating systems. The three selected operating systems are decompressed from compressed blob storage portion 402 and the uncompressed operating systems are moved to the newly allocated partitions. Partition B', Partition C', and partition D' may include operating system and user data storage portions for each selected operating system. For example, Partition B' includes operating system storage portion 410a for OS 1 and user data storage portion 412a for OS 1.

Partition A' includes calibration data storage portion 414a for OS 1, calibration data storage portion 414b for OS 2, and calibration data storage portion 414c for OS 3. The calibration data storage portions for each operating system, or the partitions on which they reside, may include one or more sub-partitions. For example, calibration data storage portion 414a (e.g., Partition A') may include an EFI system sub-partition, crash dump sub-partition, silicon vendor sub-partition, and/or device provisioning sub-partition.

An EFI system sub-partition may include an operating system boot manager and a boot configuration database. The boot manager and boot configuration database may be responsible for loading the main operating system and loading operating system updates. In addition, the EFI system sub-partition may include a number of UEFI applications, such as full flash update (FFU) application(s) and battery charging application(s). This sub-partition may be 32 MB in size in some implementations.

A crash dump sub-partition may be used to hold data from crash dumps when the phone powers down unexpectedly and/or experiences other problems. A crash dump sub-partition may only be maintained while the mobile phone device is in a manufacturing/testing stage in some implementations. A crash dump sub-partition may be sized three and a half times as large as available RAM. An SD card may be used instead of, or in addition to, a crash dump sub-partition or other nonvolatile storage to hold data from crash dumps.

A silicon vendor sub-partition may include UEFI and/or other vendor-specific applications defined by a silicon vendor.

A device provisioning sub-partition may include provisioning data particular to the mobile phone device, product validation keys, and/or configuration data for radio and GPS. A device provisioning sub-partition may be 8 MB in size in some implementations.

The above-described sub-partitions are provided as examples; the contents of a calibration data storage portion may vary depending on the original equipment manufacturer and/or the operating system(s) included on an on-the-fly mobile phone device.

Compressed blob 402 can use less memory storage following the repartitioning because compressed versions of OS 1, OS 2, and OS 3 need not be maintained. However, compressed versions of the unselected operating system(s) (e.g., OS 4, OS 5, OS 6, etc.) may be maintained in the compressed blob storage portion 402 through the repartitioning. This may allow a user to re-select new operating system(s) that were previously unselected. As an example, if a user selects OS 1, OS 2, and OS 4 upon a re-selection, the on-the-fly mobile phone device can repartition to remove OS 3 and add OS 4, and to compress OS 3 and decompress OS 4.

In some implementations, a mobile phone device may be configured with a one-time, on-the-fly dynamic partition layout. A one-time, on-the-fly mobile phone device may offer a selection of side-by-side operating systems only once. In contrast to the implementation described with reference to FIG. 4, the operating systems that are not selected for side-by-side existence on the mobile phone device may be deleted. As such, memory storage that would otherwise be occupied by the unselected operating systems may instead be allocated to user data storage portion(s).

Figure 5:
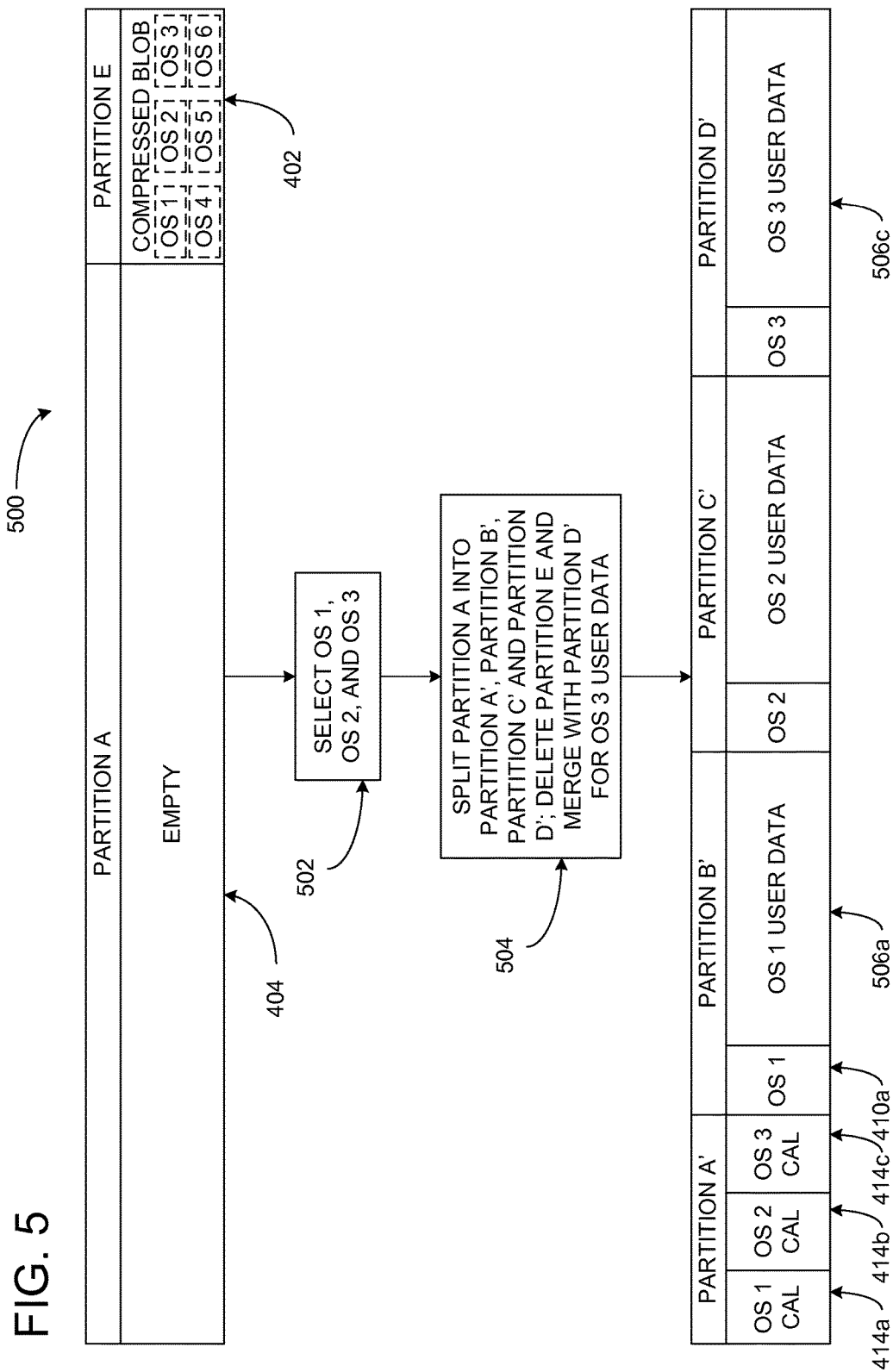
FIG. 5 shows a repartitioning of memory storage of a one-time, on-the-fly mobile phone device following selection of three operating systems.

As an example, FIG. 5 schematically shows memory storage 500 following selection of OS 1, OS 2, and OS 3 on a one-time, on-the-fly mobile phone device. Memory storage 500 may be implemented as one or more nonvolatile memory devices. In order to ease understanding, memory storage 500 is illustrated in simplified form. It is to be understood that memory storage may include additional partitions and/or store additional data.

Prior to selection of operating system(s), memory storage 500 includes Partition A and Partition E. Partition E may include compressed blob storage portion 402, and Partition A may include empty storage portion 404.

At 502, OS 1, OS 2, and OS 3 are selected. As a non-limiting example, the selected operating systems may be selected in accordance with steps 108 and 110 of FIG. 1 and/or user interface 202 of FIG. 2.

At 504, responsive to selection of OS 1, OS 2, and OS 3, Partition A is split into Partition A', Partition B', Partition C', and Partition D'. Additionally, the empty storage portion 404 (e.g., empty Partition A) is allocated to each of the three operating systems. The three selected operating systems are decompressed from compressed blob storage portion 402 and the uncompressed operating systems are moved to the newly allocated partitions. The remaining compressed blob storage portion 404 containing the unselected operating systems (e.g., OS 4, OS 5, OS 6, etc.) is deleted, and the memory storage is allocated to the user data storage portions.

Partition A' may include calibration data storage portion 414a for OS 1, calibration data storage portion 414b for OS 2, and calibration data storage portion 414c for OS 3. Partition B', Partition C', and Partition D' each have operating system storage portions and user data storage portions. For example, Partition B' has operating system storage portion 410a for OS 1. The user data storage portion 506a for OS 1 may be larger than the corresponding user data storage portion 412a for OS 1 of FIG. 4 due to the deletion and reallocation of Partition E.

Generally, a (e.g., multi) boot selection module (FIG. 8) may be configured to recognize user selection of at least one of two or more operating systems (e.g., one or more of OSes 1, 2, and 3). In some implementations, the boot selection module may be further configured to recognize a new user selection of a previously unselected operating system, and, responsive to the new user selection, reallocate a partition to the previously unselected operating system specified by the new user selection. In some implementations, the boot selection module is further configured to recognize user non-selection of at least one of the two or more operating systems. A (e.g., multi) boot allocation module (FIG. 8) may be configured to, responsive to user selection of at least one of the two or more operating systems, split an empty partition (e.g., Partition A) into a different operating system partition for each selected operating system, decompress each selected operating system, and store each decompressed operating system on its respective operating system partition (e.g., for selection of OS 1, decompress OS 1 and store decompressed OS 1 on Partition B'). In some implementations, the boot allocation module may be further configured to maintain on a blob partition (e.g., Partition E) each unselected operating system in a compressed format. In other implementations, the boot allocation module may be configured to delete each non-selected operating system. In some implementations, a new user selection includes a deselection of a previously selected operating system, and the boot allocation module is further configured to compress the deselected operating system and store the compressed deselected operating system on the blob partition. In some implementations, the boot allocation module is further configured to delete a compressed version of the selected operating system from the blob partition. In some implementations, the boot allocation module is further configured to, after storing each decompressed operating system on its respective operating system partition, decrease a size of the blob partition. In some implementations, the boot allocation module is further configured to create a calibration data partition from an empty partition, the calibration data partition storing respective calibration data for each selected operating system. In some implementations, the boot allocation module is configured to, responsive to user non-selection of at least one of the two or more operating systems, delete the non-selected operating system.

Figure 6:
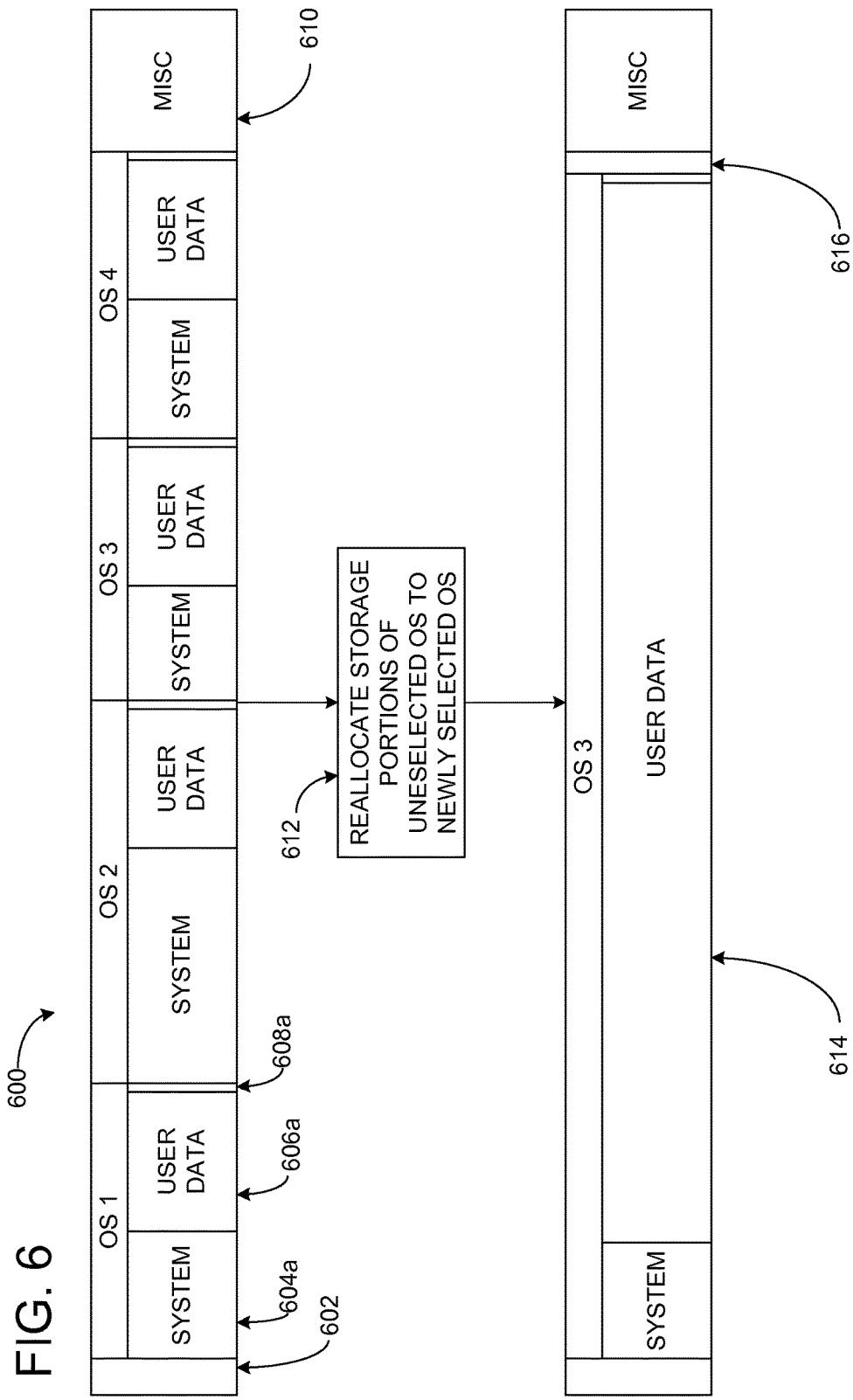
FIG. 6 shows a reallocation of the storage portions of a mobile phone device upon selection of an operating system from an out-of-box power up.

FIG. 6 schematically shows the reallocation of memory storage 600 of another example dual boot mobile phone device following selection of a default operating system during an out-of-box power up. Memory storage 600 may be implemented as one or more nonvolatile memory devices. As one example, memory storage 600 may be implemented as flash memory with a flash layout that accommodates two or more operating systems.

As discussed above, the memory storage of the dual boot mobile phone device may be pre-loaded with a plurality of operating systems. Responsive to a default operating system being selected as part of the out-of-box experience, the unselected operating systems may be deleted and the storage portions previously occupied by the deleted operating systems may be reallocated to memory storage for the selected operating system.

As initially configured prior to selection of the default operating system (i.e., OS 3), memory storage 600 includes a power up module 602. The power up module may include an SBL, UEFI, and/or any other components used during power up, operating system selection, and/or operating system loading.

In the illustrated example, memory storage 600 is also pre-loaded with four operating systems: OS 1, OS 2, OS 3, and OS 4. Each operating system may include system components (e.g., system component 604a for OS 1). System components may include a kernel, device drivers, user interface modules, system utilities, and/or other components. Non-user "provisioning data," for example, modem, calibration data, and nonvolatile items may be flashed side-by-side during manufacturing and need not be shared between operating systems. In this way, the mobile phone device may be manufactured with two or more complete and discrete sets of provisioning data. The original equipment manufacturer, however, may choose to store identical data in both provisioning storage portions.

One or more operating systems may include a replay protected memory block (RPMB). The RPMB may include, as examples, a bitlocker key, virtual smartcard key, app store certificates, DRM keys and corporate certificates. Such information may be protected from other operating systems.

Each operating system may also include a user data component (e.g., user data component 606a for OS 1). User data components may include non-system applications and user-specific data such as contacts, email, text messages, photos, music, personal preferences, and the like.

Furthermore, each operating system may include a re-install seed (e.g., reinstall seed 608a for OS 1). The re-install seed may be left behind after the other portions of an operating system are deleted. The re-install seed may be a program configured to reacquire a complete operating system after other portions of the operating system are deleted from the dual boot mobile phone device. The re-install seed allows a user to reacquire and use an operating system that was deleted due to a previous selection. The re-install seed may be configured to obtain the operating system via a network (e.g., the Internet), computer-readable media (e.g., compact disc or removable storage drive), or any other suitable delivery mechanism. For example, the re-install seed may include a network module for connecting to a remote server at a predetermined network address; and the network module may be configured to download the operating system from the remote server.

Memory storage 600 also includes a miscellaneous data storage portion 610 that includes a variety of data that is not particular to the power up module 602 or the various pre-loaded operating systems. The miscellaneous data storage portion may be protected from reallocation so that the miscellaneous data persists regardless of the operating system that is selected and/or the operating system(s) that are deleted.

As a non-limiting example, the miscellaneous data storage portion 610 may include nonvolatile shared data that is useable by two or more different operating systems. As one example, an OS-agnostic contact list, which is accessible by two or more different operating systems, may be maintained in the miscellaneous data storage portion 610. In this way, a user's contacts may be accessed by any operating system that is selected, even if the user decides to change from one operating system to another.

As another non-limiting example, the miscellaneous data storage portion 610 may include a security zone in which high security data, applications, licenses, cryptographic keys, and/or other high security items are maintained. The security zone may include security items that are particular to a specific operating system, security items that are useable by two or more different operating systems, and/or security items that are directly useable by other components of the dual boot mobile phone device (e.g., the boot loader).

As schematically illustrated by the initial out-of-box configuration of memory storage 600, a substantial portion of the memory storage portion is occupied by operating systems that will not be used. While it may be useful to provide full working versions of two or more operating systems so that a user can easily select a preferred operating system, including the extra operating systems limits the amount of space available to the selected operating system. As such, space occupied by unselected operating systems may be reallocated to the selected operating system.

With reference to FIG. 6, at 612, responsive to the selection of OS 3, the unselected operating systems (i.e., OS 1, OS 2, and OS 4) are deleted, and memory storage is reallocated to selected OS 3. Provisioning data may not be deleted, allowing devices to be "refurbished" at a distribution center. If provisioning data is deleted, the corresponding reinstall seed may be configured to reacquire the provisioning data. In some implementations, the deletion of unselected operating systems, the reallocation of memory storage, and/or the activation of re-install seeds may all be managed by the UEFI.

As configured after selection of the default operating system (i.e., OS 3), memory storage 600 includes the power up module 602 and the miscellaneous data storage portion 610. Furthermore, memory storage 600 includes default operating system OS 3. After reallocation, a larger portion of memory storage 600 is allocated to the user data component 614. Memory storage 600 also includes re-install seeds 616 for the deleted operating systems (i.e., OS 1, OS 2, and OS 4).

By maintaining the re-install seeds, an operating system that is deleted (e.g., OS 1, OS 2, or OS 4) may be reacquired and loaded, as discussed above. For example, with reference to 120 of FIG. 1, if the selected operating system is not installed at 112, method 100 includes installing the selected operating system on the mobile phone device. When a selected operating system is not installed, a re-install seed for the selected operating system may be activated on the mobile phone device in order to reacquire the selected operating system.

Figure 7:
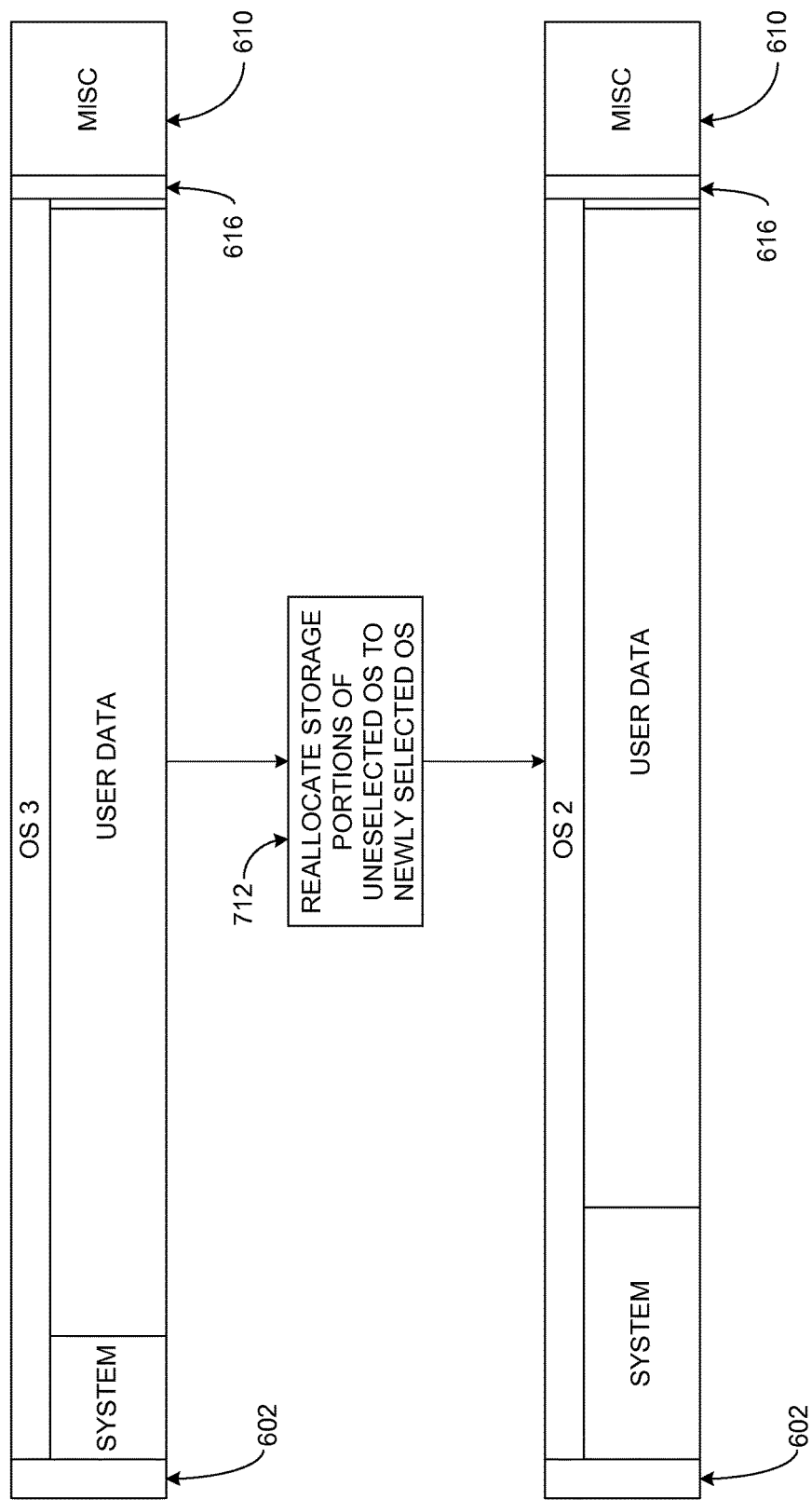
FIG. 7 shows a reallocation of the storage portions of a mobile phone device upon a re-selection of an operating system.

As an example implementation, FIG. 7 schematically shows a scenario in which OS 2 is selected to replace previously-selected OS 3. Prior to this replacement selection, memory storage 600 includes a power up module 602, a miscellaneous data storage portion 610, OS 3, and re-install seeds 616.

With reference to FIG. 7, at 712, responsive to the replacement selection of OS 2, the previously selected operating system (i.e., OS 3) is deleted, and memory storage is reallocated to newly selected OS 2. In some implementations, the previously selected operating system is not deleted until the newly selected operating system is successfully acquired and installed.

Following reallocation, memory storage 600 now includes OS 2, and the space previously occupied by OS 3 is reallocated to OS 2. The re-install seed for OS 3 is added to the re-install seeds 616 so that OS 3 can be reacquired if requested. Memory storage also includes the power up module 602 and miscellaneous data storage portion 610.

In yet other implementations, a mobile phone device may be configured to operate with side-by-side OSes. In these implementations, the mobile phone device is configured to interrupt during every warm boot, regardless of user input. However, a reallocation of storage portions may not be done when a new selection is made; rather, the one or more operating systems are all maintained in the memory storage of the mobile phone device. The operating systems on the mobile phone device may have common shared partitions as well as separate operating system and user data partitions.

In some implementations, the original equipment manufacturers may be capable of enabling or disabling the dual boot function of a dual boot mobile phone device.

In some implementations, over-the-air updates may be available to one or more operating systems on a dual boot mobile phone device. In further implementations, during an out-of-box power up, firmware associated with a selected operating system may be updated via over-the-air updates to the version applicable to the version of the operating system.

In some implementations, an original equipment manufacturer may make changes to factory floor processes to manufacture a dual boot mobile phone device. This may include the capability to accommodate installation of multiple operating systems onto a single mobile phone device, such as Windows Phone™ OS and Android™ OS. Furthermore, in some implementations, merely the re-install seeds of operating systems may be pre-installed onto the dual boot mobile phone device, rather than the entire operating system(s). In some implementations, calibration tools may be modified such that the mobile phone device calibration by manufacturers is done only once for testing and/or manufacturing.

While manufacturing a dual boot mobile phone device, the dual boot mobile phone device may be repeatedly booted into any operating system for testing, calibration, storing nonvolatile items, and other functions. Thus, in some implementations, each operating system may not corrupt, read, or write data owned by another operating system. For example, Windows Phone™ OS may not boot up and then delete the Android™ OS install partition. Furthermore, in some implementations, all storage portions of the memory storage of a dual boot mobile phone device may be accessible to an original equipment manufacturer. Secure boot firmware may be utilized on all operating systems on the dual boot mobile phone device, such as Android™ OS. In some implementations, the entire boot chain, including the SBL, may utilize secure boot firmware.

In some implementations, an original equipment manufacturer may configure the operating system configuration so the dual boot mobile phone device functions are enabled upon an out-of-box power up.

Some operating systems may have unique partition layouts which may provide difficulty in reallocation of memory storage upon a selection. As examples, the number of partitions, the partition file names, and the overall size of the partition may be problematic for the original equipment manufacturers during manufacturing.

Thus, in some implementations, the qualities of an operating system (and components therein) may be adjusted to make the operating system compatible with manufacturing. For example, an Android™ OS partition layout may be unmodifiable via the layout xml file (e.g., "hard coded"), and therefore may be changed to a more flexible layout. In another implementation, the dual boot mobile phone device may have applications to change partition layouts after the dual boot mobile phone device is manufactured, wherein the unique partition layouts may conflict with functions of the dual boot mobile phone device, but not with manufacturing.

Furthermore, in some implementations, the file formats of partitions may be changed to be utilized by flashing tools, such as FFUTool. For example, the Android™ OS "flat" file format may be changed to a "sparse" file format in order to be incorporated into a full flash update (FFU) file. "simg2img" is an example of a tool that may change file formats of storage portions. In some implementations, the FFU file format may be extended to encapsulate both a normal mobile phone device and a dual boot mobile phone device. In other implementations, other file formats may be prevalent on dual boot mobile phone devices.

In yet further implementations, mobile phone devices may be developed to support a dual boot mobile phone device hardware (e.g., Selfhost). As an example, QRD devices may be developed.

In some implementations, operating systems on the dual boot mobile phone device, such as Windows Phone™ OS, may be hardened against offline attacks.

In some implementations, as a worst case scenario, the dual boot mobile phone device may boot to the FFU downloader mode.

In some implementations, the hardware key requirement for chassis spec may be removed. Rather, a soft key feature may be implemented.

In some implementations, at the manufacturing floor, the original equipment manufacturer flashes an eMMC image that has a minimal set of bootable partitions, the UEFI, and OS images. The device may boot into the "OS Selection" UEFI application.

In further implementations, upon selection during a first out-of-box power up, the UEFI app will install the OS bits from the eMMC, destroy the image files of unselected operating systems, and convert the space into user data storage.

In some implementations, exactly one copy of each operating system included is on the dual boot mobile phone device.

In some implementations, an OS image partition has two operating system binary files. As an example, a Windows Phone™ OS may have an image as flash.ffu. Furthermore, in some implementations, provisioning data may be contained in the OS image partition.

In some implementations, a progress bar showing the progress of the reallocation and loading may be displayed on the graphical display of a dual boot mobile phone device. This may be accomplished by the UEFI.

In some implementations, the phone reboots upon completing a full reallocation of a dual boot mobile phone device, then loads the selected operating system.

In some implementations, all of method 100 may be fail safe, even if a user pulls out a battery during a reallocation of storage portions, and not result in a "brick" of a mobile phone device.

Furthermore, in some implementations, the dual boot mobile phone device may be able to resume the current operation within a reallocation or loading operating system process when the phone is turned off in the middle of the reallocation process.

In some implementations, the battery power requirements for an out-of-box power up as well as other selections of an operating system may be higher than a power up without selecting a new operating system. Thus, a threshold battery charge may be implemented to ensure the selection and reallocation process may complete without the mobile phone device running out of battery power. For example, the threshold battery charge may be 40% of the maximum battery charge.

In some implementations, flashing tools, such as FFU-Tool, may flash all operating systems simultaneously, only one operating system, and/or one operating system and delete the remaining operating systems.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
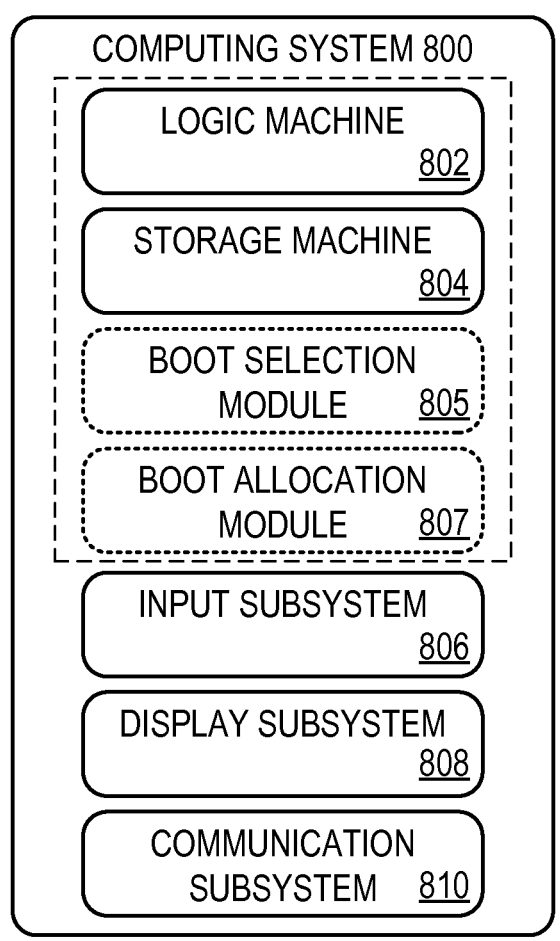
FIG. 8 schematically shows an example computing device.

FIG. 8 schematically shows a non-limiting embodiment of a computing system 800 that can enact one or more of the methods and processes described above. Computing system 800 is shown in simplified form. Computing system 800 may take the form of one or more mobile phone devices, for example, such as mobile phone device 200 (FIG. 2). It will be appreciated, however, that the approaches described herein, including operating system selection and allocation, may be implemented on other suitable computing devices, including but not limited to personal computers, server computers, tablet computers, home-entertainment computers, network computing devices, gaming devices, other mobile computing and communication devices, and/or other computing devices.

Computing system 800 includes a logic machine 802 and a storage machine 804. Computing system 800 may optionally include a display subsystem 808, input subsystem 806, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Computing system 800 may further include a boot selection module 805. As described above, boot selection module 805 may be a dual boot selection module configured to recognize user selection of a second operating system (e.g., OS 2 in FIG. 3)—e.g., selection of the second operating system and not a first operating system. The dual boot selection module may be a constituent component of a unified extensible firmware interface, for example. In other examples, boot selection module 805 may be a multi boot selection module configured to recognize user selection of at least one of two or more operating systems (e.g., one or more of OSes 1, 2, and 3). In some implementations, the boot selection module may be further configured to recognize a new user selection of a previously unselected operating system, and, responsive to the new user selection, reallocate a partition to the previously unselected operating system specified by the new user selection. In some implementations, the boot selection module is further configured to recognize user non-selection of at least one of the two or more operating systems.

Computing system 800 may further include a boot allocation module 807. With reference to FIG. 3, boot allocation module 807 may be a dual boot allocation module configured as described above to, responsive to user selection of a second operating system, automatically merge first and second partitions (e.g., partitions B and C) into a merged partition (e.g., partition B'), and automatically store user data (e.g., user data storage portion 306b) of the second operating system on the merged partition (partition B'). In some implementations, the dual boot allocation module may be further configured to delete the first operating system and first user data of the first operating system (e.g., responsive to user selection of the second operating system). In some implementations, the dual boot allocation module may be further configured to automatically maintain third and fourth partitions (e.g., partitions A and D) in addition to the merged partition (e.g., partition B') (e.g., responsive to user selection of the second operating system).

In other examples, boot allocation module 807 may be a multi boot allocation module configured to, responsive to user selection of at least one of the two or more operating systems, split an empty partition (e.g., Partition A) into a different operating system partition for each selected operating system, decompress each selected operating system, and store each decompressed operating system on its respective operating system partition (e.g., for selection of OS 1, decompress OS 1 and store decompressed OS 1 on Partition B'). In some implementations, the boot allocation module may be further configured to maintain on a blob partition (e.g., Partition E) each unselected operating system in a compressed format. In other implementations, the boot allocation module may be configured to delete each non-selected operating system. In some implementations, a new user selection includes a deselection of a previously selected operating system, and the boot allocation module is further configured to compress the deselected operating system and store the compressed deselected operating system on the blob partition. In some implementations, the boot allocation module is further configured to delete a compressed version of the selected operating system from the blob partition. In some implementations, the boot allocation module is further configured to, after storing each decompressed operating system on its respective operating system partition, decrease a size of the blob partition. In some implementations, the boot allocation module is further configured to create a calibration data partition from an empty partition, the calibration data partition storing respective calibration data for each selected operating system. In some implementations, the boot allocation module is configured to, responsive to user non-selection of at least one of the two or more operating systems, delete the non-selected operating system.

Dual boot selection module 805 and/or dual boot allocation module 807 may be instantiated via logic machine 802 executing instructions held by storage machine 804, for example.

When included, display subsystem 808 may be used to present a visual representation of data held by storage machine 804. This visual representation may take the form of a graphical user interface (GUI). As the herein described methods and processes change the data held by the storage machine, and thus transform the state of the storage machine, the state of display subsystem 808 may likewise be transformed to visually represent changes in the underlying data. Display subsystem 808 may include one or more display devices utilizing virtually any type of technology. Such display devices may be combined with logic machine 802 and/or storage machine 804 in a shared enclosure, or such display devices may be peripheral display devices.

When included, input subsystem 806 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

An example provides a mobile phone device comprising one or more non-volatile storage devices including an empty partition, and/or a blob partition storing two or more operating systems in a compressed format. In some examples, a mobile phone device comprises a boot selection module configured to recognize user selection of at least one of two or more operating systems. In some examples, a mobile phone device comprises a boot allocation module configured to, responsive to user selection of at least one of two or more operating systems, split an empty partition into a different operating system partition for each selected operating system, decompress each selected operating system, and store each decompressed operating system on its respective operating system partition. In some examples, a boot allocation module may be configured to maintain in a blob partition an unselected operating system in a compressed format. In some examples, a boot selection module may be configured to recognize a new user selection of a previously unselected operating system. In some examples, a boot allocation module may be configured to, responsive to a new user selection, reallocate a partition to a previously unselected operating system specified by the new user selection. In some examples, a new user selection may include a deselection of a previously selected operating system. In some examples, a boot allocation module may be configured to compress a deselected operating system and store the compressed deselected operating system on a blob partition. In some examples, a boot allocation module may be configured to delete a compressed version of a selected operating system from a blob partition. In some examples, a boot allocation module may be configured to, after storing each decompressed operating system on its respective operating system partition, decrease a size of a blob partition. In some examples, each operating system partition may store a respective selected operating system and user data for the respective selected operating system. In some examples, a boot allocation module may be configured to create a calibration data partition from an empty partition. In some examples, a calibration data partition may store respective calibration data for each selected operating system. In some examples, a calibration data partition may include one or more sub-partitions. In some examples, at least one of one or more sub-partitions may be an extensible firmware interface system sub-partition storing a boot manager for a selected operating system and a boot configuration database. In some examples, an extensible firmware interface system sub-partition may include one or more unified extensible firmware interface applications. In some examples, one or more unified extensible firmware interface applications may include a full flash update application. In some examples, one or more unified extensible firmware interface applications may include a battery charging application. In some examples, a calibration data partition may include a crash dump sub-partition configured to store data from crash dumps. In some examples, a calibration data partition may include a silicon vendor sub-partition configured to store one or more vendor-specific applications defined by a silicon vendor. In some examples, a calibration data partition may include a device provisioning sub-partition configured to store one or more of data particular to a mobile phone device, product validation keys, and configuration data for radio and GPS. In some examples, a boot selection module may be configured to recognize user non-selection of at least one of two or more operating systems. In some examples, a boot allocation module may be configured to, responsive to user non-selection of at least one of two or more operating systems, delete the non-selected operating system. In some examples, splitting an empty partition into a different operating system partition for each selected operating system may include formatting a file system of each different operating system partition. Any or all of the above-described examples may be combined in any suitable manner in various implementations.

Another example provides a mobile phone device comprising one or more non-volatile storage devices including an empty partition, and/or a blob partition storing two or more operating systems in a compressed format. In some examples, a mobile phone device comprises a boot selection module configured to recognize user selection of at least one of two or more operating systems. In some examples, a mobile phone device comprises a boot allocation module configured to, responsive to user selection of at least one of two or more operating systems, split an empty partition into a different operating system partition for each selected operating system, decompress each selected operating system, store each decompressed operating system on its respective operating system partition, and maintain on a blob partition each unselected operating system in a compressed format. Any or all of the above-described examples may be combined in any suitable manner in various implementations.

Another example provides a mobile phone device comprising one or more non-volatile storage devices including an empty partition, and/or a blob partition storing two or more operating systems in a compressed format. In some examples, a mobile phone device comprises a boot selection module configured to recognize user selection of at least one of two or more operating systems and non-selection of at least one of the two or more operating systems. In some examples, a mobile phone device comprises a boot allocation module configured to, responsive to user selection of at least one of two or more operating systems, split an empty partition into a different operating system partition for each selected operating system, decompress each selected operating system, store each decompressed operating system on its respective operating system partition, and delete each non-selected operating system. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mobile phone device, comprising:
one or more non-volatile storage devices including:
an empty partition; and
a blob partition storing two or more operating systems in a compressed format;
a boot selection module configured to recognize user selection of at least one of the two or more operating systems; and
a boot allocation module configured to, responsive to user selection of at least one of the two or more operating systems, split the empty partition into a different operating system partition for each selected operating system, decompress each selected operating system, and store each decompressed operating system on its respective operating system partition.

2. The mobile phone device of claim 1, wherein the boot allocation module is further configured to maintain in the blob partition an unselected operating system in the compressed format.

3. The mobile phone device of claim 2, wherein the boot selection module is further configured to recognize a new user selection of a previously unselected operating system, and the boot allocation module is further configured to, responsive to the new user selection, reallocate a partition to the previously unselected operating system specified by the new user selection.

4. The mobile phone device of claim 3, wherein the new user selection includes a deselection of a previously selected operating system, and the boot allocation module is further configured to compress the deselected operating system and store the compressed deselected operating system on the blob partition.

5. The mobile phone device of claim 2, wherein the boot allocation module is further configured to delete a compressed version of the selected operating system from the blob partition.

6. The mobile phone device of claim 1, wherein the boot allocation module is further configured to, after storing each decompressed operating system on its respective operating system partition, decrease a size of the blob partition.

7. The mobile phone device of claim 1, wherein each operating system partition stores a respective selected operating system and user data for the respective selected operating system.

8. The mobile phone device of claim 1, wherein the boot allocation module is further configured to create a calibration data partition from the empty partition, the calibration data partition storing respective calibration data for each selected operating system.

9. The mobile phone device of claim 8, wherein the calibration data partition includes one or more sub-partitions.

10. The mobile phone device of claim 8, wherein at least one of the one or more sub-partitions is an extensible firmware interface system sub-partition storing a boot manager for the selected operating system and a boot configuration database.

11. The mobile phone device of claim 10, wherein the extensible firmware interface system sub-partition includes one or more unified extensible firmware interface applications.

12. The mobile phone device of claim 11, wherein the one or more unified extensible firmware interface applications include a full flash update application.

13. The mobile phone device of claim 11, wherein the one or more unified extensible firmware interface applications include a battery charging application.

14. The mobile phone device of claim 8, wherein the calibration data partition includes a crash dump sub-partition configured to store data from crash dumps.

15. The mobile phone device of claim 8, wherein the calibration data partition includes a silicon vendor sub-partition configured to store one or more vendor-specific applications defined by a silicon vendor.

16. The mobile phone device of claim 8, wherein the calibration data partition includes a device provisioning sub-partition configured to store one or more of data particular to the mobile phone device, product validation keys, and configuration data for radio and GPS.

17. The mobile phone device of claim 1, wherein the boot selection module is further configured to recognize user non-selection of at least one of the two or more operating systems, and wherein the boot allocation module is configured to, responsive to user non-selection of at least one of the two or more operating systems, delete the non-selected operating system.

18. The mobile phone device of claim 1, wherein splitting the empty partition into a different operating system partition for each selected operating system includes formatting a file system of each different operating system partition.

19. A mobile phone device, comprising:
 one or more non-volatile storage devices including:
  an empty partition; and
  a blob partition storing two or more operating systems in a compressed format;
 a boot selection module configured to recognize user selection of at least one of the two or more operating systems; and
 a boot allocation module configured to, responsive to user selection of at least one of the two or more operating systems, split the empty partition into a different operating system partition for each selected operating system, decompress each selected operating system, store each decompressed operating system on its respective operating system partition, and maintain on the blob partition each unselected operating system in the compressed format.

20. A mobile phone device, comprising:
 one or more non-volatile storage devices including:
  an empty partition; and
  a blob partition storing two or more operating systems in a compressed format;
 a boot selection module configured to recognize user selection of at least one of the two or more operating systems and non-selection of at least one of the two or more operating systems; and
 a boot allocation module configured to, responsive to user selection of at least one of the two or more operating systems, split the empty partition into a different operating system partition for each selected operating system, decompress each selected operating system, store each decompressed operating system on its respective operating system partition, and delete each non-selected operating system.

\* \* \* \* \*